(12) United States Patent
Soderberg et al.

(10) Patent No.: US 6,542,884 B1
(45) Date of Patent: Apr. 1, 2003

(54) METHODS AND SYSTEMS FOR UPDATING AN INHERITANCE TREE WITH MINIMAL INCREASE IN MEMORY USAGE

(75) Inventors: Joel Soderberg, Edmonds, WA (US); Van C. Van, Snoqualmie, WA (US)

(73) Assignee: Microsoft Corporation, Redmond, WA (US)

(*) Notice: Subject to any disclaimer, the term of this patent is extended or adjusted under 35 U.S.C. 154(b) by 251 days.

(21) Appl. No.: 09/614,740

(22) Filed: Jul. 12, 2000

Related U.S. Application Data
(60) Provisional application No. 60/189,257, filed on Mar. 14, 2000.

(51) Int. Cl.$^7$ ............................................. G06F 17/30
(52) U.S. Cl. ............................................ 707/1; 707/100
(58) Field of Search ................... 707/1–10, 100–103

(56) References Cited

U.S. PATENT DOCUMENTS

| | | | | |
|---|---|---|---|---|
| 5,276,874 A | * | 1/1994 | Thomson .................... | 707/102 |
| 5,822,587 A | * | 10/1998 | McDonald et al. .......... | 717/108 |
| 5,878,415 A | * | 3/1999 | Olds ............................ | 707/9 |
| 5,978,582 A | * | 11/1999 | McDonald et al. .......... | 717/104 |
| 6,002,867 A | * | 12/1999 | Jazdzewski ................. | 717/105 |
| 6,018,741 A | * | 1/2000 | Howland et al. ............ | 707/102 |
| 6,275,977 B1 | * | 8/2001 | Nagai et al. ................ | 717/104 |
| 6,308,181 B1 | * | 10/2001 | Jarvis ......................... | 707/102 |
| 6,438,549 B1 | * | 8/2002 | Aldred et al. ................ | 707/9 |

* cited by examiner

Primary Examiner—Safet Metjahic
Assistant Examiner—Hanh Thai
(74) Attorney, Agent, or Firm—Workman, Nydegger & Seeley

(57) ABSTRACT

Methods and systems are described for minimizing increases in memory usage when updating an inheritance tree that follows "first one wins" inheritance semantics for property or "metadata" information. The inheritance tree is updated by writing new files to the inheritance tree, each new file potentially having property information or "metadata" associated therewith. The method examines the ancestral line of each new file that is written to the inheritance tree (and any property value in a global location if necessary) to determine whether existing property values that would be applied to the new file match the property value of the new file. If the existing property value does not match the property value of the new file, the property information is set in the ancestral line of the new file at the level of the new file itself. If the existing property value does match the property value of the new file, then the new file is written to the inheritance tree without writing the property information. Thus, as new files are written to the inheritance tree, the method reduces the amount of property information that needs to be written to the inheritance tree.

28 Claims, 2 Drawing Sheets

METHODS AND SYSTEMS FOR UPDATING AN INHERITANCE TREE WITH MINIMAL INCREASE IN MEMORY USAGE

CROSS-REFERENCE TO RELATED APPLICATIONS

The present application claims the benefit of U.S. provisional application serial No. 60/189,257, filed Mar. 14, 2000, which provisional application is incorporated herein by reference.

BACKGROUND OF THE INVENTION

1. The Field of the Invention

The present invention relates to database and file management. Specifically, the present invention relates to methods and systems for updating an inheritance tree of a hierarchical directory tree structure with minimal increase in memory usage, the hierarchical directory tree structure including properties that describe certain nodes within the hierarchical directory structure.

2. The Prior State of the Art

Computer systems typically use a hierarchical directory tree structure for organizing data objects such as files. The following illustrates a conventional hierarchical directory tree structure (hereinafter, "tree") used to store files including "file1.log" through "file5.log".

```
/root/
    dir1/
        file1.log
        file2.log
        file3.log
        file4.log
    dir2/
        file5.log
```

In the tree, directories are represented by the entries that end with a forward slash "/" while files have no such forward slash. For example, root, dir1 and dir2 are directories and file1.log, file2.log, file3.log, file4.log and file5.log are files. Each directory is followed by an indented list of resources (i.e., files or directories) directly contained by that directory. For example, the root directory "root" directly contains directories "dir1" and "dir2". The directory "dir1" directly contains files "file1.log", "file2.log", "file3.log" and "file4.log". The directory "dir2" directly contains file "file5.log".

Each file and directory represents a "node" in the hierarchical directory tree structure. With the exception of the root directory "root", each node has a "parent" node in which the node is directly contained. For example, the parent node of "dir1" and "dir2" is "root"; the parent node of "file1.log", "file2.log", "file3.log" and "file4.log" is "dir1"; and the parent node of "file5.log" is "dir2". Each directory node may also directly contain "child" nodes. For example, the child nodes of "root" are "dir1" and "dir2"; the child nodes of "dir1" are "file1.log", "file2.log", "file3.log" and "file4.log"; and the child node of "dir2" is "file5.log".

Each file has an "ancestral line" proceeding from right to left through the progenitors of the file starting at the file and terminating at the root directory. For example, the ancestral line of "file1.log" proceeds from "file1.log" through "dir1" and to "root". The ancestral lines of "file2.log", file3.log" and "file4.log" also proceed from the respective file though "dir1" and to "root". The ancestral line of "file5.log" proceeds from "file5.log" through "dir2" and to "root". This proceeding from child to parent through the ancestral line will be referred to as proceeding "up" the ancestral line.

A typical file system might represent a file with its ancestral line. For example, in a file system that uses backslashes, "file5.log" might be represented as "root\dir2\file5.log".

Conventional hierarchical directory tree structures may also store property information (sometimes termed "metadata") that describes the nodes in the tree. For files, this property information might include the content type, title, subject, author, creation date, last edited date and so forth. For directories, this property information might include the content type to be inherited by descendent files, the title, the creation date, the available free space size and so forth.

In the following discussion, the focus will be on a property called a file extension/content type mapping (sometimes termed "MIMEMAP") in which certain file extensions are mapped to certain content types. For example, "mimemap '.log; text/plain'" is a mapping property that would indicate that, for the corresponding node, files that have the ".log" extension are in plain text format.

For example, the following tree illustrates a conventional hierarchical directory tree structure similar to the above-described tree, but which includes the file extension/content type map "mimemap: '.log; text/plain'" for the root directory "root/".

```
/root/ | mimemap:".log;text/plain"
    dir1/
        file1.log
        file2.log
        file3.log
        file4.log
    dir2/
        file5.log
```

Sometimes a hierarchical directory tree structure follows "first one wins" inheritance semantics in which property information for a certain directory applies by inheritance to all descendent files and directories contained within the parent directory. However, following "first one wins" inheritance semantics, the inherited property value can be overwritten for any of the descendent files or directories. In "first one wins" inheritance semantics, if the property value for a file property is found at the file itself, then that is the property value that applies to the file. If the property value for a file property is not found at the file itself, then one examines the ancestral line of the file to determine the first node that has a property value for the corresponding property proceeding up the ancestral line. The file inherits that first property value found. If there is no property value for the corresponding property at the file or in the ancestral line, then a derived property value is applied to the file from a "global" location which may be in another branch of the inheritance tree or may be completely outside of the inheritance tree.

In the example tree immediately above, assume that "first one wins" inheritance semantics are followed. This would means that the mapping of file extensions ".log" to the plain text format content type in the root directory "root" would apply to all of the descendent files and directories of the root directory. Since none of the descendent files and directories has a mapping property that expresses overwrites the mapping in the root directory, the file extension/content type mapping applies to all of the descendent files and directories within the directory "root". Since all of the files contain the ".log" extension, all of the files "file1.log", "file2.log", "file3.log", "file4.log" and "file5.log" are considered plain text files since they inherit the mapping under the "first one wins" inheritance semantics.

Now suppose that the tree is to be updated. Specifically, a new plain text file called "file6.log" is to be written into "dir1" of the tree. Conventional methods would write the file extension/content type mapping directly at the new file "file6.log" as follows.

```
/root/ | mimemap:".log;text/plain"
    dir1/
        file1.log
        file2.log
        file3.log
        file4.log
        file6.log | mimemap:".log;text/plain"
    dir2/
        file5.log
```

Suppose that now a HyperText Markup Language (HTML) text file called "file7.log" is written into "dir1" of the tree. Conventional methods would write the file extension/content type mapping for that specific file directly at the file as follows.

```
/root/ | mimemap:".log;text/plain"
    dir1/
        file1.log
        file2.log
        file3.log
        file4.log
        file6.log | mimemap:".log;text/plain"
        file7.log | mimemap:".log;text/html"
    dir2/
        file5.log
```

Note that for every new file written into the tree, the conventional method of updating the tree has written a corresponding file extension/content type mapping property for the file. In trees in which numerous new files are written into the tree, the number of file/extension mapping properties for the tree can become enormous consuming massive quantities of memory space.

Therefore, what is desired are methods and system for updating a hierarchical directory tree structure that follows inheritance semantics while minimizing memory usage.

SUMMARY OF THE INVENTION

Methods and systems are described for minimizing increases in memory usage when updating an inheritance tree. An inheritance tree is a parent-child hierarchical directory tree structure that contains files and directory and that also contains property information for some of the files and directories in the tree. In the inheritance tree, property information for a parent directory is inherited by its descendent files and directories. The exception is that the inherited property information is not inherited by a descendent file or directory (or by the descendent's descendents) that has property information that expressly contradicts the inherited property information.

The inheritance tree is updated by writing new files to the inheritance tree. Each new file may contain a property and a property value. For example, a mapping of file extensions to content types might be a property associate with a file. For instance, the mapping might express that files having the ".log" extension are plain text files.

The method determines whether an existing property value that would be applied to the new file matches the property value of the new file. Under "first one wins" inheritance semantics, an existing property value may be applied to a file by either being 1) set at the file itself, 2) inherited from a node in the ancestral line of the file if the property value is not set at the file itself, or 3) derived from a global location if the value is not set at the file nor at any level in the ancestral line of the file.

For example, if the root directory in the inheritance tree indicated that ".log" files are to be interpreted as being plain text files, then this mapping would be inherited by all descendent files and directories in the root directory unless expressly contradicted. However, if a new HTML text file called "file.log" is to be written into the directory, this file would not follow the existing inherited mapping that ".log" files are plain text files. That is because the new file "file.log" is not a plain text file, but is an HTML text file despite having the ".log" extension. Thus, in this case, the existing property value that would be applied to the new file through inheritance does not match the property value of the new file.

If the method determines that the existing property value does not match the property value of the new file, the property value of the new file is set to be its correct value. This may be accomplished in a number of ways. One way is to set the property information in the ancestral line of the new file. For example, the property value may be set in the ancestral line at the level of the new file itself. In this case, the new file would not incorrectly inherit the existing property value; but instead, the incorrect inherited value is overwritten by the correct value set at the new file. Alternatively, the method may set the new correct value at a progenitor level within the ancestral line. In this alternative, the progenitor level should be a descendent of the level where the existing inherited property value was set. Also, care should be taken not to change any property values of descendent files of the progenitor level.

If the method determines that the existing property value does match the property value of the new file, then the new file is written to the inheritance tree without writing the property information. This is proper since the new file would either correctly inherit the existing property value from one of its progenitors, or the value would be derived for the new file from the global location. In this case, writing the property information for the new file is avoided entirely. Thus, as new files are written to the inheritance tree, the method reduces the amount of property information that needs to be written to the inheritance tree. Thus, the method minimizes increases in memory usage required during updating of the inheritance tree. The conserved memory may then be used for other useful purposes.

In one expansion of this method, the method determines whether or not there is an existing property value at all corresponding to the property for the new file. The above method would then be performed only if there is an existing property value. If there is no existing property value, then the property value for the new file is set so as to reduce the probability that future write requests will result in future property information writes. In one example, this is accomplished by first determining whether or not there is any property information written in the ancestral line of the new file. If so, then the property information for the new file is written in the ancestral line at the level where the other property information was found. If not, then the property information is written at the root location of the virtual server.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
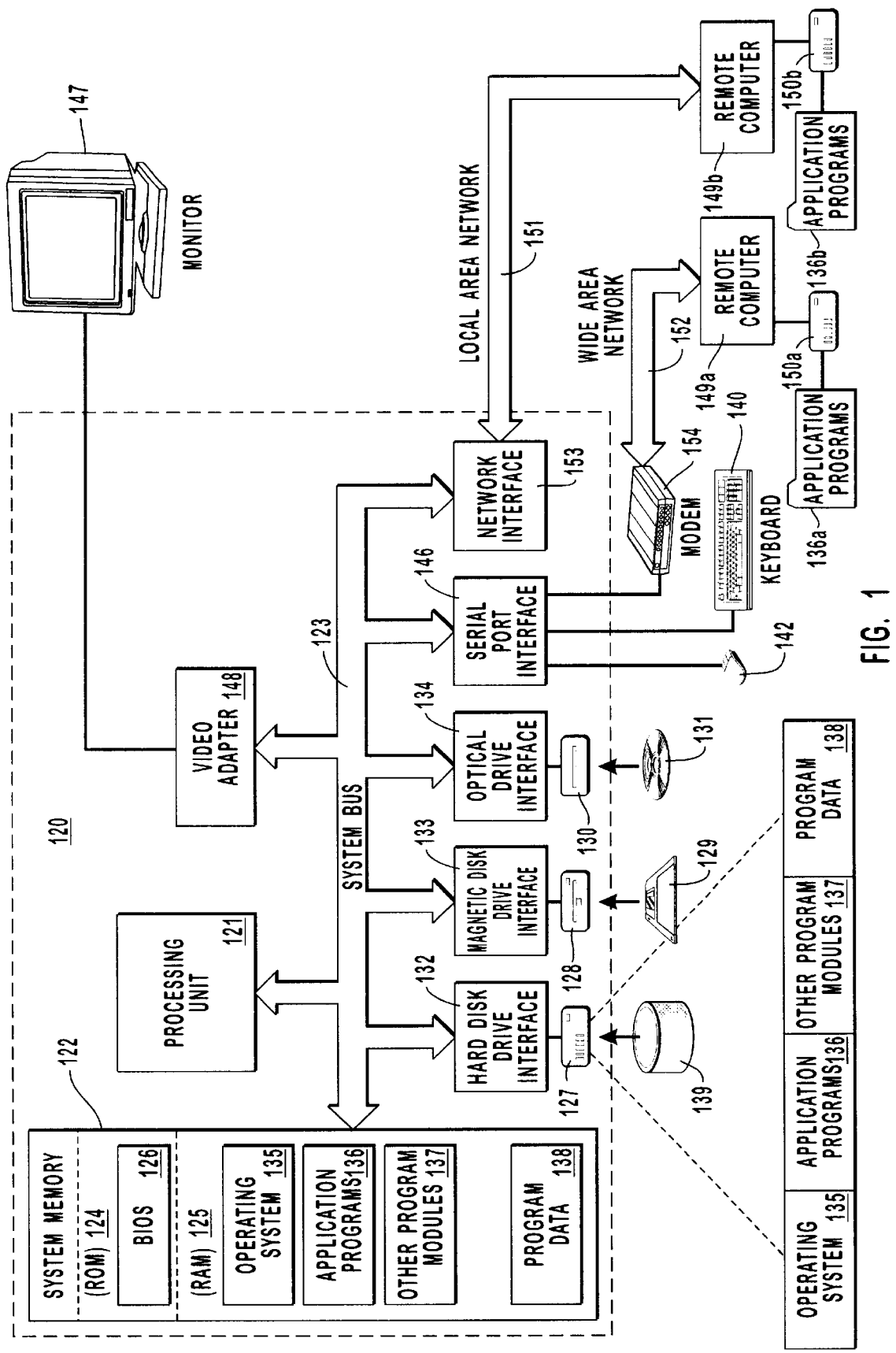
FIG. 1 illustrates an exemplary system that provides a suitable operating environment for the present invention.

The present invention extends to both methods and systems for updating an inheritance tree with minimal increase in memory usage. In this description and in the claims, an "inheritance tree" is a hierarchical directory tree structure in which property information is stored for nodes within the hierarchical directory tree structure. The inheritance tree follows "first one wins" inheritance semantics which means, in this description and in the claims, that property information for a parent node is inherited to all descendent resources (e.g., files and directories) directly or indirectly contained by the given node. The exception to this would be that a descendent resource can have corresponding property information that expressly overwrites the inherited property information set at the parent node.

In other words, as one looks for the property information from the child up the ancestral line, the "first one" that defines the property wins. If a property value for a corresponding property is found set at the file itself, then that property value applies to the file for that given property. If a property value for the corresponding property is not found at the level of the new file, then one proceeds up the ancestral line of the file until a property value corresponding to the property is found. This property value is then inherited by the file. If there is no property value for the corresponding property found either at the level of the new file or anywhere in its ancestral line, then the file derives the property value from a global location. The methods and systems of the present invention reduce the memory usage required to update the inheritance tree by reducing the amount of property information that needs to be stored when updating the tree.

The embodiments of the present invention may comprise a special purpose or general purpose computer including various computer hardware, as discussed in greater detail below. Embodiments within the scope of the present invention also include computer program products or computer-readable media for carrying or having computer-executable instructions or data structures stored thereon. Such computer-readable media can be any available media which can be accessed by a general purpose or special purpose computer. By way of example, and not limitation, such computer-readable media can comprise physical storage mediums such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

As mentioned above, the present invention relates to a method for updating an inheritance tree with minimal increase in memory usage. The inheritance tree may be stored in any memory device capable of storing the inheritance tree. For example, the memory device may include databases within system memory 122 and include portions of ROM 124 and/or RAM 125. In addition, the memory device may include one or more of the magnetic hard disk 139, the removable magnetic disk 129, and/or optical disk 131. Essentially, any memory device or combination of memory devices will suffice so long as it is capable of storing the inheritance tree and so long as the computer system is capable of writing new files to the inheritance tree.

Figure 2:
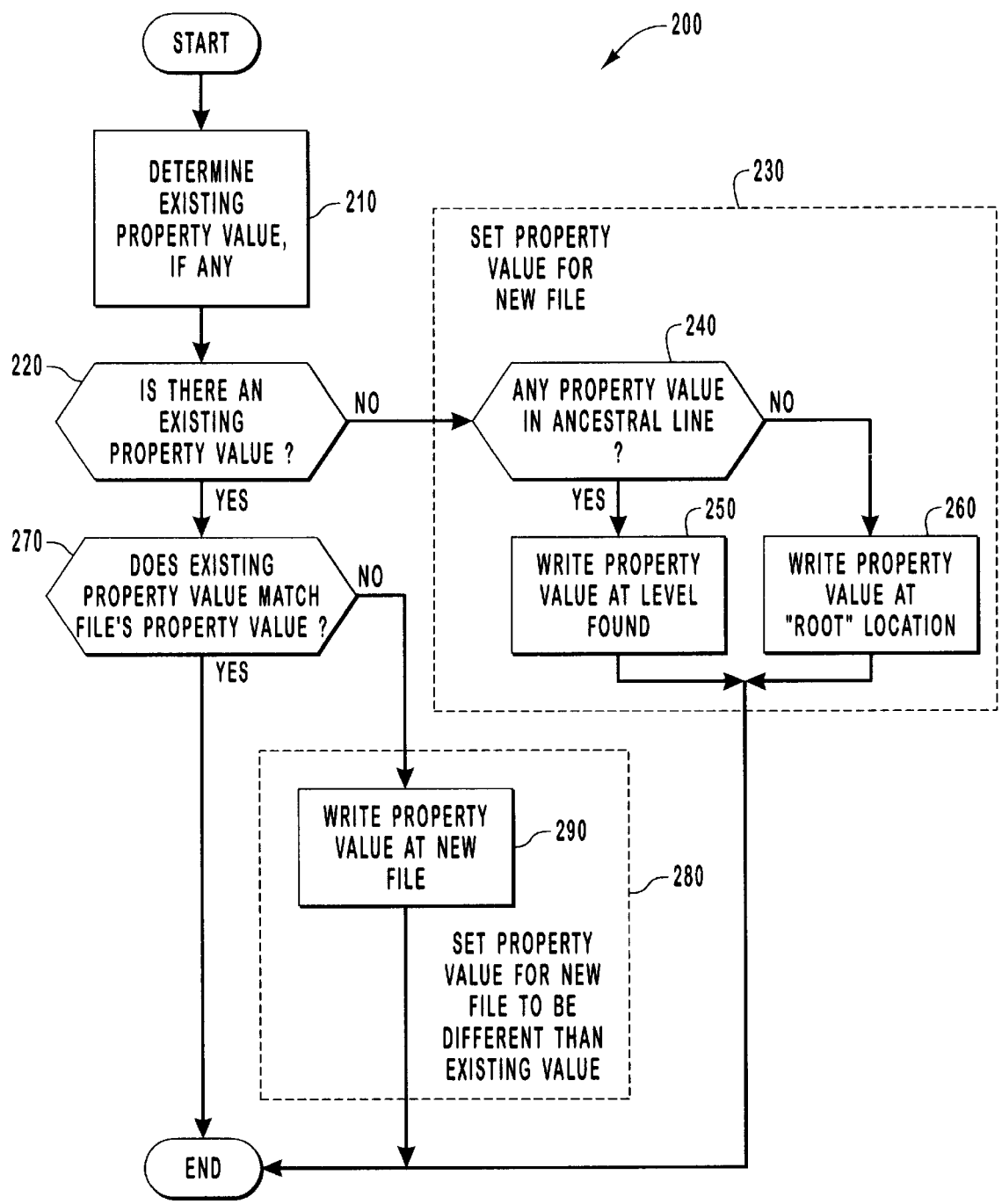
FIG. 2 is a flowchart of a method of writing property information to an inheritance tree so as to minimize increases in memory usage when updating the inheritance tree.

FIG. 2 illustrates a method 200 of updating properties in an inheritance tree. The method is repeated each time a new resource (such as a file or directory) having an associated property and property value is written to the inheritance tree. For clarity, the method is first explained generally and is then followed by specific examples.

First, the method determines the existing property value that would be applied to the new file, if any, for each corresponding property associated with the new file (step 210). If a version of the new file already exists in the inheritance tree, then that file is examined to determine if there is any property value for the corresponding property set at the level of the file. If there is such a property value, that is the existing property value that would be applied to the new file by already being set at the file level.

If there is no such property value set at the level of the file itself, then the examination proceeds up the ancestral line to find the first property value corresponding to the property. The first such property value found would then be the existing property value that would be applied to the new file by inheritance.

If there is no such property value set at the level of the file itself or in the ancestral line of the file, then a global location is examined to find any property value set at the global location for the corresponding property. This property value would then be the existing property value that would be applied to the new file by derivation. This global location may be within the inheritance tree, but outside of the ancestral line of the file, or may be entirely outside of the inheritance tree. The method then performs different processes depending on whether or not there is an existing property value that would be applied to the new file (decision block 220).

If there is no existing property value that would be applied to the new file, ("NO" in decision block 220), then the method performs a step for setting the property value for the new file (step 230) in the inheritance tree. The method may do this by writing the property value directly at the new file in the inheritance tree. Alternatively, the method may write the property value at any of the ancestral levels associated with the new file even as far as the "root" directory of the virtual server. If written at an ancestral level, the new property value will be inherited by the new file as an inherited value through "first one wins" inheritance semantics.

Whatever alternative is chosen for the step for setting the property value for the new resource (step 230), the step is preferably chosen so as to reduce the number of future writings of property values for files subsequently written to the inheritance tree. In the embodiment shown in FIG. 2, the step 230 first determines if there are any property values in the ancestral line (decision block 240) of the new file. If so ("YES" in decision block 240), then the property value for the new file is written to whatever level in the ancestral line was found to have a property value (step 250). If not ("NO" in decision block 240), then the property value is written in the "root" directory (step 260).

Recall that step 230 is only performed if there is no existing property value for the property associated with the new file ("NO" in decision block 220). The method proceeds along a different path if there is an existing property value ("YES" in decision block 220). In the latter case, the method then determines whether or not the existing property value matches the property value for the new resource (decision block 270).

If the existing property value does not match the existing property value ("NO" in decision block 270), then the method performs a step for setting the property value for the new file in the inheritance tree to be different than the existing property value (step 280). The method may do this by writing the property value at any of the levels within the ancestral line of the new file. For example, the method may write the property value directly at the new file in the inheritance tree. Alternatively, the method may write the property value at any of the progenitor levels of the new file so long as that level is a child to the level at which any existing inherited property value for the corresponding property is set. In this alternative, although the property value is not written at the level of the new file, the property value is inherited by the new file following "first one wins" inheritance semantics.

Whatever alternative is chosen for the step for setting the property value for the new file in the inheritance tree to be different than the existing property value (step 280), the step is preferably chosen so as to reduce the number of future writings of property values for files subsequently written to the inheritance tree. If the computer system writing new resources to the inheritance tree is able to predict that most files written into a certain directory are going to have a certain property value similar to the property value of the new file, the computer system might opt to write the property value at that particular directory. This would reduce the number of property values that would need to be written for subsequent files written into that directory since most of these new files would have property values that match the existing property value set at that directory. In the embodiment of FIG. 2, the step for setting the property value for the new file to be different than the existing property value (step 280) is performed by writing the property value directly at the new file (step 290).

If the existing property value the matches the property value of the new file ("YES" in decision block 270), then the method simply ends without writing any new property values into the inheritance tree. This is because the new property value of the new file is properly represented by the existing property value that would be applied to the new file. Since a new property value was not written in this case, additional memory is not used to accurately represent the property value of the new file. In cases in which there is no existing property value ("NO" in decision block 220), the step for setting the property value if there is no existing property value (step 230) and the step for setting the property value to be different than the existing property value (step 280) are designed so as to increase the probability that future write requests will result in the method determining that the existing property value matches the new property value for the new resources thereby foregoing the need to write the new property value. The optimal configuration of the steps for setting the property values will depend on the anticipated characteristics of future write requests to the inheritance tree.

The operation of the method will now be explained by using following series of examples in which there are assumed to be no property values at the global location of that would apply to files that have no corresponding property values listed in their ancestral lines. The examples begin with the following inheritance tree structure:

```
/root/
    dir1/ | mimemap:"jpg;pic/jpg"
        dir11/
        dir12/
    dir2/
```

The above example shows that a root directory "root" contains two child directories "dir1" and "dir2". In addition, the directory "dir1" contains two child directories "dir11" and "dir12" while the directory "dir2" is empty. The example inheritance tree structure does not initially contain any files. The file extension/content type mapping "mimemap: ".jpg; pic/jpg" indicates that for descendent files of "dir1" which have the ".jpg" extension, the existing mapping of files having the ".jpg" extension is to a content type of a jpg picture. Although the directory "dir1" does not yet contain any descendent files, this existing mapping value may be inherited by ftiture files written to the inheritance tree.

Now, assume that a plain text file called "file1.log" is to be written into the inheritance tree in the directory "dir2". A mapping of "mimemap: '.log; text/plain'" would apply to this file to indicate that "file1.log" is a plain text file since it has a file extension ".log". The method of FIG. 2 would result in the mapping being written at the "root" directory of the virtual server. The resulting inheritance tree is set forth below.

```
/root/ | mimemap:".log;text/plain"
    dir1/ | mimemap:".jpg;pic/jpg"
        dir11/
        dir12/
    dir2/
        file1.log
```

In order to produce the above resulting inheritance tree, the method of FIG. 2 would review the ancestral line of the new file to determine if there is any existing property value (step 210). In this case, the ancestral line would begin with the new file to be written "file1.log" and proceed down the tree through the directory "dir2" and terminate at the root directory "root". None of these levels contains a mapping for ".log" files. The method would then examine any ",log"

mapping values at the root location (also step 210). In this case, there were initially assumed to be no default values at the root location. Therefore, decision block 220 determines that there are no existing property values ("NO" in decision block 220) and the method proceeds to decision block 240.

Decision block 240 determines whether there are any property values at all in the ancestral line whether that property be a mapping or any other type of property. In this case, root directory "root" and directory "dir2" had no associated property information at all ("NO" in decision block 240). Accordingly, the property value "mimemap: '.log: text/plain'" is written at the root location (step 260), thus resulting in the inheritance tree immediately above.

According to "first one wins" inheritance semantics, the mapping "mimemap: '.log; text/plain'" would be applied by default to any resource in the inheritance tree unless overwritten. The directory "dir2" and the file "file1.log" do not have associated property information that overwrites this mapping. Accordingly, the mapping applies to "dir2" and "file1.log". The directory "dir1" has an existing mapping of "mimemap: '.jpg; pic/pjg'". This value does not overwrite the mapping "mimemap: '.log; text/plain'" in the root location since these mappings relate to files of different extensions. Therefore, the existing mapping value for ".log" files in the directory "dir1" is also "mimemap: '.log; text/plain'" as applied through inheritance from the root directory.

Suppose that a new HyperText Markup Language (HTML) text file called "file2.htm" is to be written in the directory "dir11". A mapping of "mimemap: '.htm; text/html'" would apply to this file to indicate that "file2.htm" is an HTML text file since it has an extension ".htm". The method of FIG. 2 would result in the mapping being written at the "dir1" level of the inheritance tree resulting in the following inheritance tree structure.

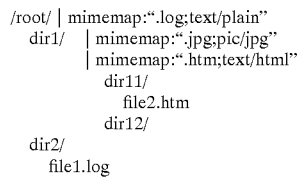

In order to produce the above inheritance tree, the method of FIG. 2 would review the ancestral line of the new file "file2.htm" to determine if there are any existing property values that would be applied to the new file (step 210). In this case, the ancestral line would begin with the new file "file2.htm" and proceed down the tree through directory "dir11", through directory "dir1" and terminate at the root directory "root". None of these levels contains a mapping for ".htm" files that would be inherited by "file2.htm". Also, there is no default mapping for ".htm" files in the global location since there are assumed in this example to be no relevant property values listed in the global location. Therefore, decision block 220 determines that there are no existing property values ("NO" in decision block 220) and the method proceeds to decision block 240.

Decision block 240 determines whether there are any property values at all in the ancestral line whether that property be a mapping or any other type of property. In this case, directory "dir11" does not have any associated property values. However, directory "dir1" does contain a property value "mimemap: '.jpg; pic/jpg'" that also happens to be a mapping, but for files having a ".jpg" extension.

Therefore, decision block 240 determines that there is a property value in the ancestral line ("YES" in decision block 240). Accordingly, the new property value "mimemap: '.htm; text/html'" is written at the directory "dir1" level where the other property value was found (step 250), thus resulting in the inheritance tree immediately above.

According to "first one wins" inheritance semantics, the mapping "mimemap: '.htm; text/html'" at the directory "dir1" would be inherited by any descendent resources that the directory "dir1" contains unless overwritten. Since the directory "dir11" and the file "file2.htm" do not overwrite the mapping for ".htm" files, the mapping at the "dir1" level would be inherited by "file2.htm" thereby corrected classifying the content type of "file2.htm" as an HTML text file.

Suppose that a new HTML text file called "file3.log" is to be written in the directory "dir2". A mapping of "mimemap: '.log; text/html'" would apply to this file to indicate that "file3.log" is an HTML text file since it has an extension ".log". The method of FIG. 2 would result in the mapping being written directly at the new file "file3.log" resulting in the following inheritance tree structure.

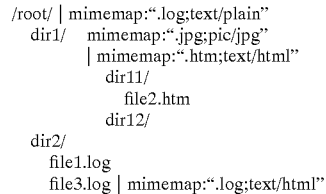

In order to produce the above inheritance tree, the method of FIG. 2 would review the ancestral line of the new file "file3.log" to determine if there are any existing property values that would be applied to the new file (step 210). In this case, the ancestral line would begin with the new file "file3.log" and proceed down the tree through directory "dir2" and terminate at the root directory "root". It turns out that the root directory "root" has an existing ".log" mapping of "mimemap: '.log; text/plain'". Therefore, decision block 220 determines that there are existing property values that would be applied to the new file ("YES" in decision block 220) and the method proceeds to decision block 270.

Decision block 270 determines whether the existing property value "mimemap: '.log; text/plain'" matches the property value "mimemap: '.log; text/html'" of the new file "file3.log". Clearly, "mimemap: '.log; text/plain" does not match "mimemap: '.log; text/html'" as the former indicates that ".log" files are plain text files while the latter indicates that ".log" files are HTML text files. Therefore, decision block 270 determines that the existing property value does not match the new file's property value ("NO" in decision block 270). Accordingly, the new property value "mimemap: '.log; text/html'" is written at the level of the new file "file3.log" (step 290) as indicated in the inheritance tree immediately above.

According to "first one wins" inheritance semantics, the mapping "mimemap: '.log; text/plain'" at the root directory "root" would have applied by inheritance to the new file "file3.log". However, the writing of the new property "mimemap: '.log; text/html'" at the file "file3.log" has the effect of negating the ".log" mapping for the new file "file3.log" and applying the mapping "mimemap: '.log; text/html'" as the new mapping.

Suppose that several new files called "file4.htm", "file5.htm", "file6.htm", "file7.htm", "file8.log", "file9.log"

and "file10.log" are to be written in the inheritance tree. "file4.htm" is an HTML text file that is to be written into "dir11". Directory "dir11" has an existing mapping value for ".htm" files of HTML text as inherited from the directory "dir1". "file5.htm", "file6.htm" and "file7.htm" are HTML text files that are to be written into "dir12". Directory "dir12" has an existing mapping value for ".htm" files of HTML text as also inherited from the directory "dir1". "file8.log", "file9.log" and "file10.log" are plain text files that are to be written into "dir2". Directory "dir2" has an existing mapping value for ".log" files of plain text as inherited from the root directory "root". The resulting inheritance tree would appear as follows.

```
/root/  | mimemap:".log;text/plain"
   dir1/   | mimemap:".jpg;pic/jpg"
           | mimemap:".htm;text/html"
       dir11/
           file2.htm
           file4.htm
       dir12/
           file5.htm
           file6.htm
           file7.htm
   dir2/
       file1.log
       file3.log  | mimemap:".log;text/html"
       file8.log
       file9.log
       file10.log
```

Note that for each of these new files from "file4.htm" through "file10.log", there is an existing property value ("YES" in decision block 220) that matches the new file's property value ("YES" in decision block 270). Therefore, the method of FIG. 2 proceeds through decision blocks 220 and 270 and ends without having written any property values corresponding to the new files. The mapping values for each of the new files "file4.htm" through "file10.log" are correctly inherited from the corresponding existing mapping values. For example, the HTML text files "file4.htm", "file5.htm", "file6.htm" and "file7.htm" correctly inherit the mapping "mimemap: '.htm; text/html'" from the directory "dir1". The plain text files "file8.log", "file9.log" and "file10.log" correctly inherit the mapping "mimemap: '.log; text/plain'" from the root directory "root".

Since the method correctly maintains property information for new files written to the inheritance tree without having to write the property information for each new file, the method minimizes the memory usage required to maintain property information for any given hierarchical directory tree structure. Therefore, methods and systems for updating an inheritance tree with minimal increase in memory usage have been described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a database wherein directories and files within the database are related to one another in a parent-child hierarchical inheritance tree, such that properties of a parent are inherited by its descendants unless otherwise specified, and such that a child and its progenitors form an ancestral line, an improved method of digitally processing the database in order to update the inheritance tree, each time a computing system adds a new file that has a property and a property value associated with it, the improved method of digitally processing the database comprising the following:

an act of determining whether an existing property value in the hierarchical tree that would be applied to the new file is consistent with the property value of the new file;

and if not, an act of writing the property value of the new file to the inheritance tree, somewhere in the ancestral line of the new file so that the property value of the new file will then be reflected in the hierarchical tree in a manner so that the property value of the new file is inherited by the new file so as to reduce memory usage increases;

and if so, an act of writing the new file to the inheritance tree without writing the property value of the new file in the hierarchical tree.

2. A method in accordance with claim 1, wherein the act of writing the property value of the new file to the inheritance tree somewhere in the ancestral line of the new file comprises the following:

an act of writing the property value of the new file to the inheritance tree in the ancestral line of the new file at the level of the new file.

3. A method in accordance with claim 1, wherein the act of writing the property value of the new file to the inheritance tree somewhere in the ancestral line of the new file comprises the following:

an act of writing the property value of the new file to the inheritance tree in the ancestral line of the new file at the level of one of the progenitors of the new file.

4. A method in accordance with claim 1, wherein the property is a mapping of file extensions to content types.

5. A method in accordance with claim 1, wherein the act of determining whether an existing property value in the hierarchical tree that would be applied to the new file is consistent with the property value of the new file comprises an act of determining whether there is an existing property value at all corresponding to the property of the new file; wherein the method further comprises the following;

if there is no existing property value, a step for placing the property value for the new file at a point in the ancestral line for the new file so as to reduce the number of future writings of property values for files subsequently written to the inheritance tree.

6. A method in accordance with claim 1, wherein the act of determining whether an existing property value in the hierarchical tree that would be applied to the new file is consistent with the property value of the new file comprises an act of determining whether there is an existing property value at all corresponding to the property of the new file; wherein the method further comprises the following:

if there is no existing property value, an act of determining whether there are any properties listed in the ancestral line of the new file;

and if so, an act of writing the property value of the new file in the ancestral line of the new file where the properties were found;

and if not, an act of writing the property value of the new file at a root location.

7. A method in accordance with claim 1, wherein the root location is a root location from the perspective of a virtual server.

8. A computer program product for use in a database wherein directories and files within the database are related to one another in a parent-child hierarchical inheritance tree, such that properties of a parent are inherited by its descendants unless otherwise specified, and such that a child and its progenitors form an ancestral line, the computer program product comprising computer-executable instructions for performing an improved method of digitally processing the database in order to update the inheritance tree, each time a computing system adds a new file that has a property and a property value associated with it, the computer-executable instructions, when executed by a processor, performing the following:

an act of determining whether an existing property value in the hierarchical tree that would be applied to the new file is consistent with the property value of the new file;

and if not, an act of writing the property value of the new file to the inheritance tree, somewhere in the ancestral line of the new file so that the property value of the new file will then be reflected in the hierarchical tree in a manner so that the property value of the new file is inherited by the new file so as to reduce memory usage increases;

and if so, an act of writing the new file to the inheritance tree without writing the property value of the new file in the hierarchical tree.

9. A computer program product in accordance with claim 8, wherein the computer program product is a physical storage medium.

10. A computer program product in accordance with claim 8, wherein the computer-executable instructions for performing the act of writing the property value of the new file to the inheritance tree somewhere in the ancestral line of the new file comprise computer-executable instructions for performing the following:

an act of writing the property value of the new file to the inheritance tree in the ancestral line of the new file at the level of the new file.

11. A computer program product in accordance with claim 8, wherein the computer-executable instructions for performing the act of writing the property value of the new file to the inheritance tree somewhere in the ancestral line of the new file comprise computer-executable instructions for performing the following:

an act of writing the property value of the new file to the inheritance tree in the ancestral line of the new file at the level of one of the progenitors of the new file.

12. A computer program product in accordance with claim 8, wherein the computer-executable instructions for performing the act of determining whether an existing property value in the hierarchical tree that would be applied to the new file is consistent with the property value of the new file comprises computer-executable instructions for performing an act of determining whether there is an existing property value at all corresponding to the property of the new file; wherein the computer program product further comprises computer-executable instructions for performing the following:

if there is no existing property value, a step for placing the property value for the new file at a point in the ancestral line for the new file so as to reduce the number of future writings of property values for files subsequently written to the inheritance tree.

13. A method in accordance with claim 8, wherein the computer-executable instructions for performing the act of determining whether an existing property value in the hierarchical tree that would be applied to the new file is consistent with the property value of the new file comprise computer-executable instructions for performing an act of determining whether there is an existing property value at all corresponding to the property of the new file; wherein the computer program product further comprises computer-executable instructions for performing the following:

if there is no existing property value, an act of determining whether there are any properties listed in the ancestral line of the new file;

and if so, an act of writing the property value of the new file in the ancestral line of the new file where the properties were found;

and if not, an act of writing the property value of the new file at a root location.

14. In a database wherein directories and files within the database are related to one another in a parent-child hierarchical inheritance tree, such that properties of a parent are inherited by its descendants unless otherwise specified, and such that a child and its progenitors form an ancestral line, an improved method of digitally processing the database in order to update the inheritance tree, each time a computing system adds a new file that has a property and a property value associated with it, the improved method of digitally processing the database comprising the following:

an act of determining whether an existing property value in the hierarchical tree that would be applied to the new file is consistent with the property value of the new file;

and if not, a step for placing the property value for the new file at a point in the ancestral line for the new file so as to reduce the number of future writings of property values for files subsequently written to the inheritance tree so as to reduce memory usage increases;

and if so, an act of writing the new file to the inheritance tree without writing the property value of the new file in the hierarchical tree.

15. A method in accordance with claim 14, wherein the step for placing the property value for the new file in the ancestral line for the new file comprises the following:

an act of writing the property value of the new file to the inheritance tree, somewhere in the ancestral line of the new file so that the property value of the new file will then be reflected in the hierarchical tree in a manner so that the property value of the new file is inherited by the new file.

16. A method in accordance with claim 15, wherein the act of writing the property value of the new file to the inheritance tree somewhere in the ancestral line of the new file comprises the following:

an act of writing the property value of the new file to the inheritance tree in the ancestral line of the new file at the level of the new file.

17. A method in accordance with claim 15, wherein the act of writing the property value of the new file to the inheritance tree somewhere in the ancestral line of the new file comprises the following:

an act of writing the property value of the new file to the inheritance tree in the ancestral line of the new file at the level of one of the progenitors of the new file.

18. A method in accordance with claim 14, wherein the property is a mapping of file extensions to content types.

19. A method in accordance with claim 14, wherein the act of determining whether an existing property value in the hierarchical tree that would be applied to the new file is consistent with the property value of the new file comprises an act of determining whether there is an existing property value at all corresponding to the property of the new file.

20. A method in accordance with claim 19, wherein the step for placing the property value for the new file in the ancestral line of the new file so as to reduce the number of future writings of property values for files subsequently written to the inheritance tree comprises the following:

an act of determining whether there are any properties listed in the ancestral line of the new file;

and if so, an act of writing the property value of the new file in the ancestral line of the new file where the properties were found;

and if not, an act of writing the property value of the new file at a root location.

21. A method in accordance with claim 14, wherein the root location is a root location from the perspective of a virtal server.

22. A computer program product for use in a database wherein directories and files within the database are related to one another in a parent-child hierarchical inheritance tree, such that properties of a parent are inherited by its descendants unless otherwise specified, and such that a child and its progenitors form an ancestral line, the computer program product comprising computer-executable instructions for performing an improved method of digitally processing the database in order to update the inheritance tree, each time a the computing system adds a new file that has a property and a property value associated with it, the computer-executable instructions, when executed by a processor, performing the following:

an act of determining whether an existing property value in the hierarchical tree that would be applied to the new file is consistent with the property value of the new file;

and if not, a step for setting the property value for the new file in the inheritance tree to be different than the existing property value in a manner so as to reduce the number of future writings of property values for file subsequently written to the inheritance tree so as to reduce memory usage increases;

and if so, an act of writing the new file to the inheritance tree without writing the property value of the new file in the hierarchical tree.

23. A computer program product in accordance with claim 22, wherein the computer program product is a physical storage medium.

24. A computer program product in accordance with claim 22, wherein the computer-executable instructions for performing the step for setting the property value for the new file in the inheritance tree to be different than the existing value comprise computer-executable instructions for performing the following:

an act of writing the property value of the new file to the inheritance tree, somewhere in the ancestral line of the new file so that the property value is inherited by the new file.

25. A computer program product in accordance with claim 24, wherein the computer-executable instructions for performing the act of writing the property value of the new file to the inheritance tree, somewhere in the ancestral line of the new file comprise computer-executable instructions for performing the following:

an act of writing the property value to the inheritance tree in the ancestral line of the new file at the level of the new file.

26. A computer program product in accordance with claim 24, wherein the computer-executable instructions for performing the act of writing the property value of the new file to the inheritance tree, somewhere in the ancestral line of the new file comprise computer-executable instructions for performing the following:

an act of writing the property value to the inheritance tree in the ancestral line of the new file at the level of one of the progenitors of the new file.

27. A computer program product in accordance with claim 22, wherein the computer-executable instructions for performing the act of determining whether an existing property value is consistent with the property value of the new file comprise computer-executable instructions for performing an act of determining whether there is an existing property value corresponding to the property of the new file.

28. A computer-program product in accordance with claim 27, wherein the computer-executable instructions for performing the step for placing the property value for the new file in the ancestral line of the new file so as to reduce the number of future writings of property values for files subsequently written to the inheritance tree comprise computer-executable instructions for performing the following:

an act of determining whether there are any properties listed in the ancestral line of the new file;

and if so, an act of writing the property value of the new file in the ancestral line of the new file where the properties were found;

and if not, an act of writing the property value of the new file at a root location.

* * * * *

UNITED STATES PATENT AND TRADEMARK OFFICE
CERTIFICATE OF CORRECTION

PATENT NO. : 6,542,884 B1 Page 1 of 1
DATED : April 1, 2003
INVENTOR(S) : Joel Soderberg and Van C. Van It is certified that error appears in the above-identified patent and that said Letters Patent is hereby corrected as shown below:

<u>Column 2,</u>
Line 66, before "a mapping" delete "has" and insert -- have --

<u>Column 3,</u>
Line 48, after "are methods and" insert -- a --

<u>Column 9,</u>
Line 61, after "property value" delete "the"

<u>Column 10,</u>
Line 16, after "using" insert -- the --
Line 41, after "be inherited by" delete "ftiture" and insert -- future --
Line 67, after "then examine any" delete "",log"" and insert -- ".log" --

<u>Column 17,</u>
Line 22, after "each time" delete "a"
Line 34, before "file subsequently" insert -- a --

Signed and Sealed this

Second Day of March, 2004

JON W. DUDAS
*Acting Director of the United States Patent and Trademark Office*